US011172117B2

(12) United States Patent
Inakura

(10) Patent No.: US 11,172,117 B2
(45) Date of Patent: Nov. 9, 2021

(54) IMAGE CAPTURE APPARATUS AND SYSTEM THAT DETERMINES A COMMON DELAY TIME WITH AT LEAST ONE OTHER IMAGE CAPTURE APPARATUS BASED ON EXPOSURE DELAY TIMES AND COMMUNICATION DELAY TIMES

(71) Applicant: CANON KABUSHIKI KAISHA, Tokyo (JP)

(72) Inventor: Keita Inakura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 16/711,025

(22) Filed: Dec. 11, 2019

(65) Prior Publication Data
US 2020/0213525 A1 Jul. 2, 2020

(30) Foreign Application Priority Data
Dec. 27, 2018 (JP) .............................. JP2018-245375

(51) Int. Cl.
*H04N 5/232* (2006.01)
*H04N 5/073* (2006.01)
*H04N 5/235* (2006.01)
*H04N 5/247* (2006.01)

(52) U.S. Cl.
CPC ..... *H04N 5/232061* (2018.08); *H04N 5/0733* (2013.01); *H04N 5/2353* (2013.01); *H04N 5/247* (2013.01)

(58) Field of Classification Search
CPC ....................... H04N 5/232061; H04N 5/0733
See application file for complete search history.

(56) References Cited

U.S. PATENT DOCUMENTS

| 9,066,023 | B2 * | 6/2015 | Shirakawa | ............. | H04N 5/247 |
| 2004/0017486 | A1 * | 1/2004 | Cooper | ................... | H04N 5/073 |
| | | | | | 348/211.1 |

FOREIGN PATENT DOCUMENTS

JP 2011-172123 A 9/2011

* cited by examiner

*Primary Examiner* — Gary C Vieaux
(74) *Attorney, Agent, or Firm* — Cowan, Liebowitz & Latman, P.C.

(57) ABSTRACT

An image capture apparatus acquires exposure delay times and communication delay times of respective other image capture apparatuses, the exposure delay times being information of times from when the other image capture apparatuses receive a shooting command until when the other image capture apparatuses start exposure, the communication delay times being information of times required in communication with the other image capture apparatuses, and determines a common delay time based on the acquired communication delay times and exposure delay times of the respective other image capture apparatuses, the common delay time being delay time information that is common to all of the other image capture apparatuses, and upon accepting a shooting instruction, transmits the shooting command including a common timing obtained from the common delay time to the other image capture apparatuses.

16 Claims, 10 Drawing Sheets

FIG. 8

| CLIENT ID | IP ADDRESS | EXPOSURE TIME LAG (ms) | ONE-WAY COMMUNICATION TIME (ms) |
|---|---|---|---|
| 1 | 192.168.100.101 | 55 | 4 |
| 2 | 192.168.100.102 | 60 | 7 |
| 3 | 192.168.100.103 | 36 | 5 |
| 4 | 192.168.100.104 | 75 | 7 |

IMAGE CAPTURE APPARATUS AND SYSTEM THAT DETERMINES A COMMON DELAY TIME WITH AT LEAST ONE OTHER IMAGE CAPTURE APPARATUS BASED ON EXPOSURE DELAY TIMES AND COMMUNICATION DELAY TIMES

BACKGROUND OF THE INVENTION

Field of the Invention

The present invention relates to a system in which a plurality of image capture apparatuses are communicably connected.

Description of the Related Art

Japanese Patent Laid-Open No. 2011-172123 discloses a synchronous shooting system in which a plurality of image capture apparatuses (cameras) are communicably connected. In the synchronous shooting system, a main image capture apparatus (master) adjusts a timing of issuance of a shooting command to each client in accordance with exposure time lags, which are delay times from when subordinate image capture apparatuses (clients) receive the shooting command until when they actually start the exposure.

However, when the master gives notification while changing the timing of issuance of the shooting command on a client-by-client basis, it is necessary to perform strict timing control with respect to all cameras at the moment of shooting. Therefore, the processing load of the master increases with an increase in the number of clients that perform synchronous shooting.

SUMMARY OF THE INVENTION

The present invention has been made in consideration of the aforementioned problems, and realizes techniques that enable synchronous shooting in which exposure timings are synchronized by controlling a plurality of image capture apparatuses, without increasing the processing load at the time of synchronous shooting.

In order to solve the aforementioned problems, the present invention provides an image capture apparatus comprising: a communication interface that communicates with at least one or more other image capture apparatuses; and a controller, wherein the controller acquires exposure delay times and communication delay times of the respective other image capture apparatuses, the exposure delay times being information of times from when the other image capture apparatuses receive a shooting command until when the other image capture apparatuses start exposure, the communication delay times being information of times required in communication with the other image capture apparatuses, determines a common delay time based on the acquired communication delay times and exposure delay times of the respective other image capture apparatuses, the common delay time being delay time information that is common to all of the other image capture apparatuses, and upon accepting a shooting instruction, transmits the shooting command including a common timing obtained from the common delay time to the other image capture apparatuses via the communication interface.

In order to solve the aforementioned problems, the present invention provides an image capture control apparatus comprising: a communication interface that communicates with at least one or more image capture apparatuses; and a controller, wherein the controller acquires exposure delay times and communication delay times of the respective image capture apparatuses, the exposure delay times being information of times from when the image capture apparatuses receive a shooting command until when the image capture apparatuses start exposure, the communication delay times being information of times required in communication with the image capture apparatuses, determines a common delay time based on the acquired communication delay times and exposure delay times of the respective image capture apparatuses, the common delay time being delay time information that is common to all of the image capture apparatuses, and upon accepting a shooting instruction, transmits the shooting command including a common timing obtained from the common delay time to the image capture apparatuses via the communication interface.

In order to solve the aforementioned problems, the present invention provides a system in which a plurality of image capture apparatuses are communicably connected, the system comprising: a first image capture apparatus including a communication interface and a controller, the communication interface being for communicating with at least one or more second image capture apparatuses, wherein the controller acquires exposure delay times and communication delay times of the respective second image capture apparatuses, the exposure delay times being information of times from when the second image capture apparatuses receive a shooting command until when the second image capture apparatuses start exposure, the communication delay times being information of times required in communication with the second image capture apparatuses, determines a common delay time based on the acquired communication delay times and exposure delay times of the respective second image capture apparatuses, the common delay time being delay time information that is common to all of the second image capture apparatuses, and upon accepting a shooting instruction, transmits the shooting command including a common timing obtained from the common delay time to the second image capture apparatuses via the communication interface; and the second image capture apparatuses each including a communication interface and a controller, the communication interface being for communicating with the first image capture apparatus, wherein the controller starts shooting processing in accordance with the common timing included in the shooting command received from the first image capture apparatus.

In order to solve the aforementioned problems, the present invention provides a method of controlling an image capture apparatus having a communication interface and a controller, the communication interface being for communicating with at least one or more other image capture apparatuses, the method comprising: acquiring exposure delay times and communication delay times of the respective other image capture apparatuses, the exposure delay times being information of times from when the other image capture apparatuses receive a shooting command until when the other image capture apparatuses start exposure, the communication delay times being information of times required in communication with the other image capture apparatuses; determining a common delay time based on the acquired communication delay times and exposure delay times of the respective other image capture apparatuses, the common delay time being delay time information that is common to all of the other image capture apparatuses; and upon accepting a shooting instruction, transmitting the shooting command including a common timing obtained from the common delay time to the other image capture apparatuses via the communication interface.

In order to solve the aforementioned problems, the present invention provides a non-transitory computer-readable storage medium storing a program for causing a computer to execute a method of controlling an image capture apparatus having a communication interface and a controller, the communication interface being for communicating with at least one or more other image capture apparatuses, the method comprising: acquiring exposure delay times and communication delay times of the respective other image capture apparatuses, the exposure delay times being information of times from when the other image capture apparatuses receive a shooting command until when the other image capture apparatuses start exposure, the communication delay times being information of times required in communication with the other image capture apparatuses; determining a common delay time based on the acquired communication delay times and exposure delay times of the respective other image capture apparatuses, the common delay time being delay time information that is common to all of the other image capture apparatuses; and upon accepting a shooting instruction, transmitting the shooting command including a common timing obtained from the common delay time to the other image capture apparatuses via the communication interface.

According to the present invention, synchronous shooting can be performed in which exposure timings are synchronized by controlling a plurality of image capture apparatuses, without increasing the processing load at the time of synchronous shooting.

Further features of the present invention will become apparent from the following description of exemplary embodiments (with reference to the attached drawings).

BRIEF DESCRIPTION OF THE DRAWINGS

FIG. 8 is a diagram showing a client management table managed by the master of the present embodiments.

DESCRIPTION OF THE EMBODIMENTS

The following describes embodiments in detail with reference to the attached drawings. Note that the following embodiments do not limit the invention pertaining to the claims. Although the embodiments describe a plurality of features, all of these plurality of features are not necessarily indispensable for the invention, and the plurality of features may be arbitrarily combined. Furthermore, the same reference sign is given to the same or like constituents throughout the attached drawings, and overlapping descriptions will be omitted.

Below, a synchronous shooting system in which two or more digital cameras (hereinafter, cameras) are communicably connected will be described. Note that in the system of the present embodiments, a master corresponds to a main camera that transmits a shooting command to a client, and at least one client corresponds to a subordinate camera that receives the shooting command transmitted from the master. Furthermore, although the present embodiments will be described using an example in which the present embodiments are applied to a digital camera of a single-lens reflex type as an image capture apparatus, the present embodiments may be applied to a compact-type camera, a digital video camera, a surveillance camera, a medical camera, and the like. In addition, the present embodiments may be applied to an apparatus having a camera function, such as a mobile telephone, a smartphone which is one type of mobile telephone, a tablet device, a personal computer (PC), an eyeglass-type terminal, and a wristwatch-type terminal.

Also, a master and a client may not particularly differ from each other in terms of configuration and functions, which will be described later, and may be configured such that they can operate either as a master or as a client in accordance with a user setting. That is to say, even when a master and a client have been switched in the course of a shooting sequence, which will be described later, they can operate as cameras after the switching. Moreover, the present invention can be realized even when the master and one or more clients are models that are different from one another.

First Embodiment

In a first embodiment, a description is given of a method of performing synchronous shooting by controlling all clients from a master and designating an exposure timing as an absolute time via a user operation in a system in which two or more cameras with different exposure time lags are communicably connected to one another.

<Apparatus Configuration>

A configuration and functions of cameras of the present embodiment are now described with reference to FIGS. 1A, 1B, and 2.

First, an external configuration of a camera 100 of the present embodiment will be described with reference to FIGS. 1A and 1B.

Figure 1A:
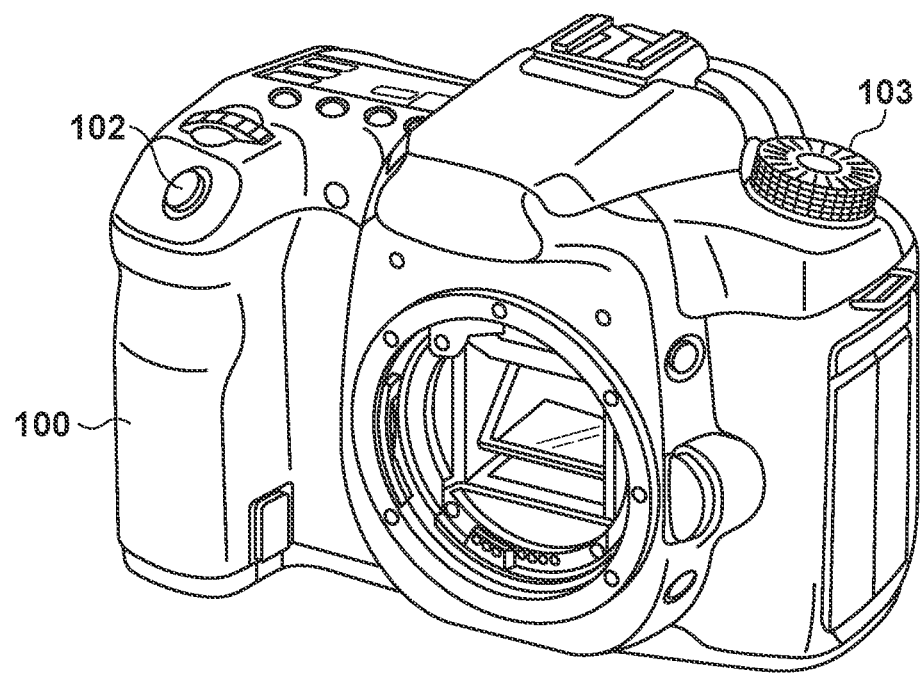
FIG. 1A is a perspective view showing an external configuration of an apparatus of the present embodiments.
Figure 1B:
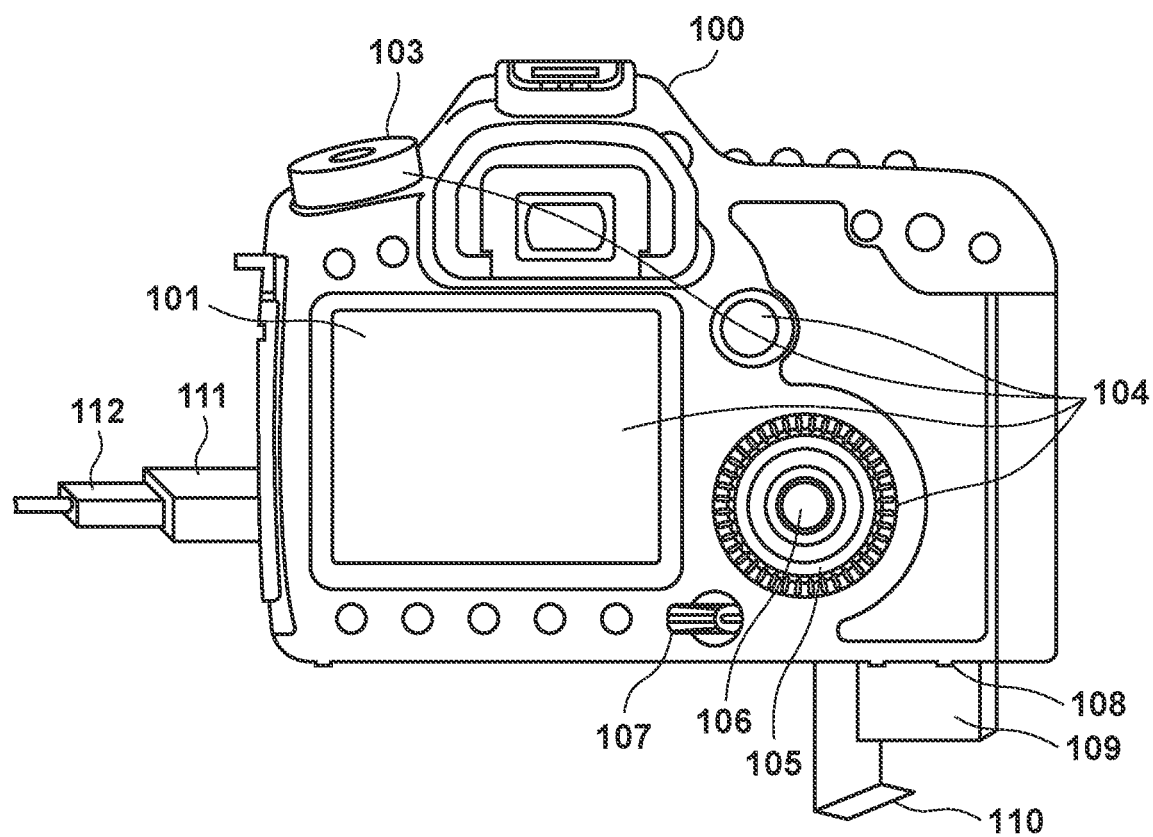
FIG. 1B is a back view showing the external configuration of the apparatus of the present embodiments.

FIG. 1A is a front perspective view of the camera 100, and FIG. 1B is a back view of the camera 100.

In FIGS. 1A and 1B, a display unit 101 is composed of, for example, a liquid crystal display panel (LCD) that displays images and various types of information. A shutter button 102 is an operation unit for issuing a shooting instruction. A mode dial 103 is a rotatable operation unit for switching among various types of modes. Operation units 104 are operation units that include operation members, such as various types of switches, buttons, and a touchscreen, for accepting various types of operations from a user. A controller wheel 105 is a rotatable operation unit included in the operation units 104. A SET button 106, which allows the user to make a final decision, is provided at a central portion of the controller wheel 105. A power switch 107 is an operation unit that switches between ON and OFF of the power. A recording medium 109 is a recording medium such as a memory card, a hard disk, or the like. A recording medium slot 108 is a slot for storing the recording medium 109. The recording medium 109 stored in the recording medium slot 108 can communicate with the camera 100. A cover 110 is a cover for the recording medium slot 108. FIG. 1A shows a state where the cover 110 is open and the recording medium 109 is partially extracted and exposed from the recording medium slot 108. A connector 111 is an interface for connection between a connection cable 112 and the camera 100.

Figure 2:
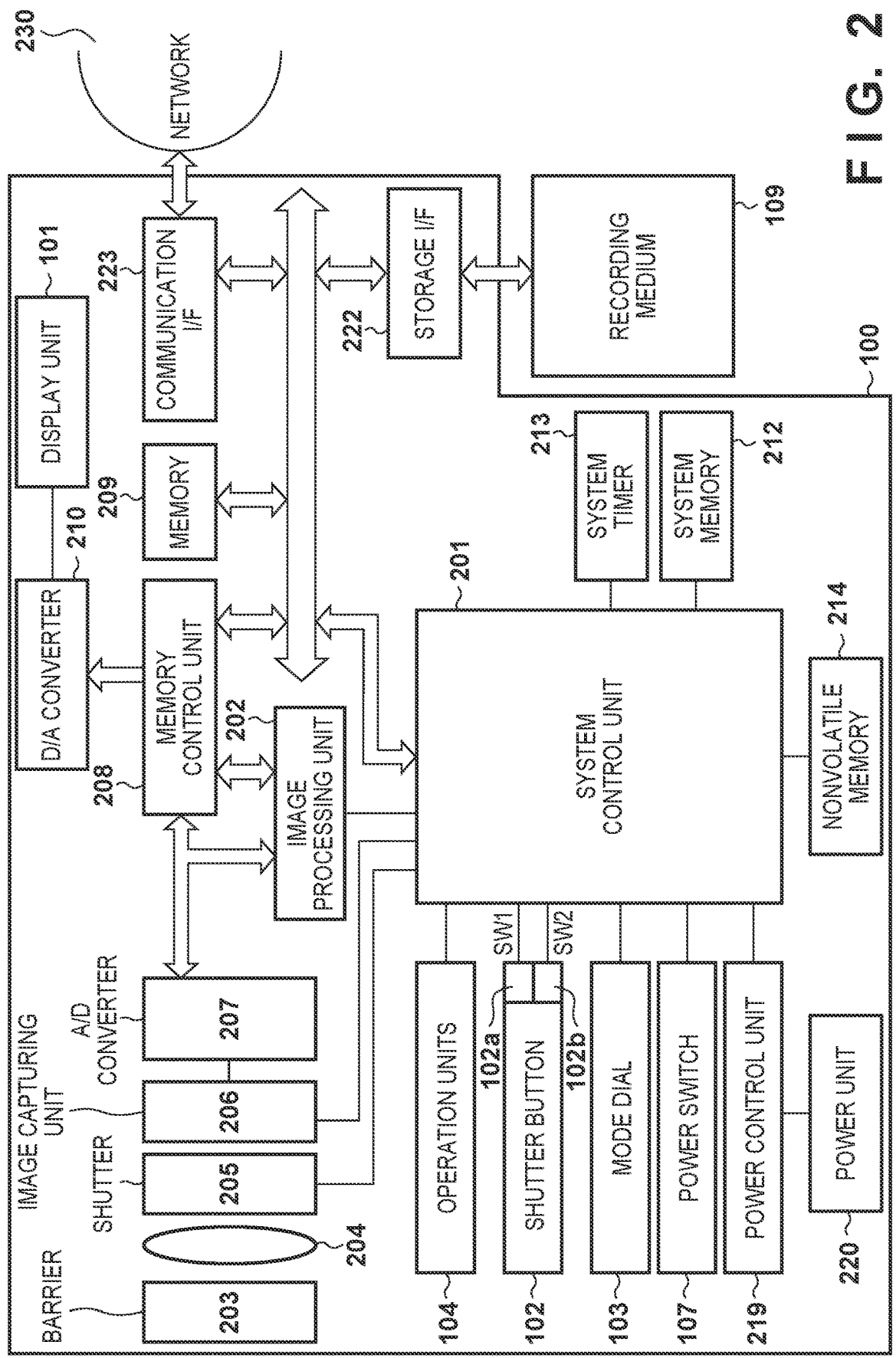
FIG. 2 is a block diagram showing an internal configuration of the apparatus of the present embodiments.

FIG. 2 shows an internal configuration of the camera 100 of the present embodiment.

A photographing lens 204 is a lens group including a zoom lens and a focusing lens. A shutter 205 has a diaphragm function. An image capturing unit 206 is an image sensor composed of a CCD, a CMOS, or the like that converts an optical image of a subject into an electrical signal. An A/D converter 207 converts an analog signal into a digital signal. The A/D converter 207 is used to convert an analog signal output from the image capturing unit 206 into a digital signal. A barrier 203 covers an image capturing system of the camera 100, including the photographing lens 204, so as to prevent the image capturing system, including the photographing lens 204, the shutter 205, and the image capturing unit 206, from being soiled or damaged.

An image processing unit 202 applies predetermined pixel interpolation, resizing processing including reduction, and color conversion processing to data from the A/D converter 207 or data from a memory control unit 208. The image processing unit 202 also performs predetermined computational processing using captured image data, and a system control unit 201 performs exposure control and rangefinding control based on the acquired computation result. As a result, TTL (through-the-lens) AF (autofocus) processing, AE (automatic exposure) processing, and EF (preliminary flash emission) processing are performed. Furthermore, the image processing unit 202 performs predetermined computational processing using captured image data, and performs TTL AWB (auto white balance) processing based on the acquired computation result.

Output data from the A/D converter 207 is written directly into a memory 209 via the image processing unit 202 and the memory control unit 208, or via the memory control unit 208. The memory 209 stores image data that has been acquired by the image capturing unit 206 and converted into digital data by the A/D converter 207, and image data to be displayed on the display unit 101. The memory 209 has a storage capacity sufficient to store a predetermined number of still images, as well as moving images and audio of a predetermined duration.

The memory 209 also functions as a memory for image display (video memory). A D/A converter 210 converts data for image display stored in the memory 209 into an analog signal, and supplies the analog signal to the display unit 101. In this way, image data for display that has been written into the memory 209 is displayed by the display unit 101 via the D/A converter 210. The display unit 101 performs display on a display device, such as an LCD, in accordance with an analog signal from the D/A converter 210. Digital signals that have undergone the A/D conversion in the A/D converter 207 and have been accumulated in the memory 209 are converted into analog signals in the D/A converter 210, and then the analog signals are sequentially transferred to and displayed on the display unit 101; in this way, live-view display can be performed.

A nonvolatile memory 214 is an electrically erasable and recordable memory; for example, an EEPROM or the like is used thereas. For example, constants and programs for the operations of the system control unit 201 are stored in the nonvolatile memory 214. The programs mentioned here refer to programs for executing processing related to synchronous shooting, which will be described later, in the present embodiment.

The system control unit 201 controls the entire camera 100. Each processing of the present embodiment, which will be described later, is realized by executing a program stored in the nonvolatile memory 214 mentioned earlier. 212 denotes a system memory, and a RAM is used thereas. Constants and variables for the operations of the system control unit 201, programs that have been read from the nonvolatile memory 214, and the like are deployed to the system memory 212. The system control unit 201 also performs display control by controlling the memory 209, the D/A converter 210, the display unit 101, and the like.

A system timer 213 is a time measurement unit that measures times used in various types of control and the time of an internal clock.

The mode dial 103, a first shutter switch 102a, a second shutter switch 102b, and the operation units 104 are operation means for inputting various types of operational instructions to the system control unit 201.

The mode dial 103 switches an operation mode of the system control unit 201 to one of a still image shooting mode, a moving image recording mode, a playback mode, and so on. Examples of modes included in the still image shooting mode are an auto mode, an auto scene determination mode, a manual mode, various types of scene modes in which shooting settings are configured on a scene-by-scene basis, a program AE mode, and a custom mode. Using the mode dial 103, one of these modes can be switched to directly. Alternatively, after switching to a shooting mode selection screen using the mode dial 103, one of the options corresponding to the respective shooting modes displayed on the shooting mode selection screen may be selected and switched to using another operation member. Likewise, the moving image recording mode may include a plurality of modes.

The first shutter switch 102a is turned ON and generates a first shutter switch signal SW1 partway through an operation performed on the shutter button 102 provided in the camera 100, that is to say, when the button is depressed halfway (a shooting preparation instruction). Shooting preparation processing, such as AF processing, AE processing, AWB processing, and EF processing, is started in response to the first shutter switch signal SW1.

The second shutter switch 102b is turned ON and generates a second shutter switch signal SW2 upon completion of the operation performed on the shutter button 102, that is to say, when the button is fully depressed (a shooting instruction). The system control unit 201 starts a series of shooting processing, from reading out signals from the image capturing unit 206 to writing image data into the recording medium 109, in response to the second shutter switch signal SW2.

For example, performing an operation of selecting various types of function icons displayed on the display unit 101 will assign functions to the respective operation members of the operation units 104 as appropriate on a scene-by-scene basis; as a result, the respective operation members act as various types of function buttons. Examples of the function buttons include an end button, a return button, a next image button, a jump button, a sort button, an attribute change button, and so on. For example, a menu screen on which various types of settings can be configured is displayed on the display unit 101 when a menu button is pressed. The user can configure various types of settings intuitively using the menu screen displayed on the display unit 101, the controller wheel 105, and the SET button 106.

For example, when an operation of rotating the controller wheel 105 is performed, an electrical pulse signal is generated in accordance with the amount of operation, and the system control unit 201 controls each component of the camera 100 based upon this pulse signal. The angle by which the controller wheel 105 has been rotated through the operation, how many times it has been rotated, and the like can be determined using this pulse signal. Note that the controller wheel 105 may be any operation member as long as it can detect a rotating operation. For example, it may be a dial operation member which allows the controller wheel 105 itself to rotate to generate the pulse signal in accordance with a rotating operation performed by the user. Furthermore, it may be an operation member which is composed of a touch sensor, and which does not allow the controller wheel 105 itself to rotate but detects a rotating motion and the like of the user's finger on the controller wheel 105 (a so-called touch wheel).

A power control unit 219 is composed of, for example, a battery detection circuit, a DC-DC converter, a switch circuit for switching among the blocks to which current is supplied, and detects whether a battery is loaded, the battery type, and the remaining battery power. The power control unit 219 also controls the DC-DC converter based on the detection results and an instruction from the system control unit 201, and supplies a necessary voltage for a necessary period to the respective components, including the recording medium 109.

A power unit 220 is composed of a primary battery (e.g., an alkaline battery and a lithium battery), a secondary battery (e.g., a NiCd battery, a NiMH battery, and a lithium-ion battery), an AC adapter, or the like. A storage I/F 222 is an interface for the recording medium 109, which is a memory card, a hard disk, or the like. The recording medium 109 is a recording medium, such as a memory card, for recording shot images, and is composed of a semiconductor memory, a magnetic disk, or the like.

A communication interface (I/F) 223 is an interface that can connect to a network 230, such as a wireless LAN (Local Area Network) and the Internet, and is intended for communication between the system control unit 201 and an external device, such as a relay device. The system control unit 201 can transmit images that have undergone image capturing processing in the image capturing unit 206 (including through-the-lens images) and image files recorded in the recording medium 109 to the external device, and can receive image data and various types of other information from the external device, via the communication I/F 223.

Note that a touchscreen capable of detecting contact with the display unit 101 is included as one of the operation units 104. The touchscreen and the display unit 101 can be configured integrally. For example, the touchscreen is configured to have a light transmittance that does not interfere with the display of the display unit 101, and is then attached to the top layer of a display surface of the display unit 101. Input coordinates of the touchscreen are then associated with display coordinates of the display unit 101. This makes it possible to configure a GUI (Graphical User Interface) in which the user seems capable of directly manipulating a screen displayed on the display unit 101.

<System Configuration>

Figure 3:
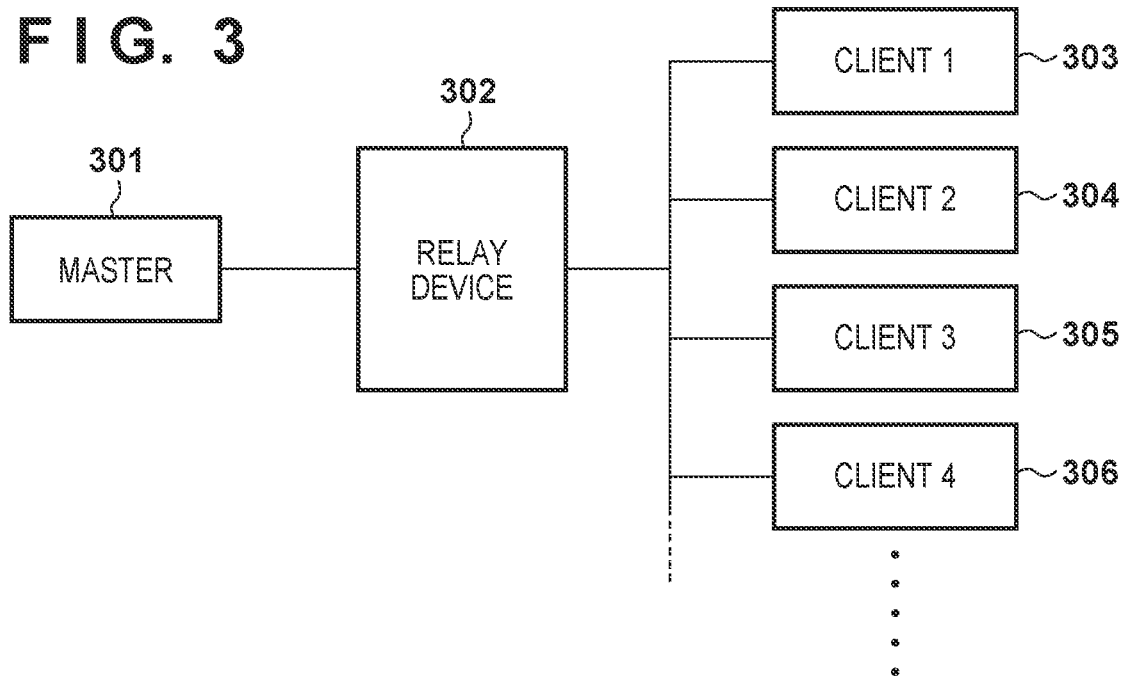
FIG. 3 is a system configuration diagram of the present embodiments.
Figure 4A:
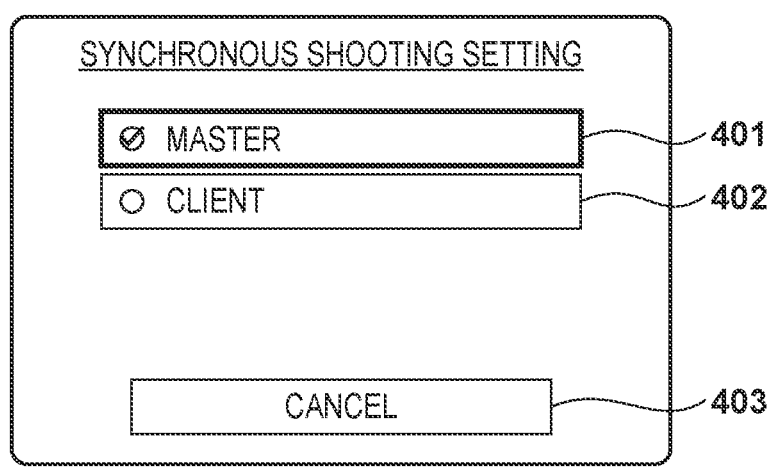
FIGS. 4A and 4B are diagrams exemplary showing setting screens for designating a master and clients in a synchronous shooting system of the present embodiments.
Figure 4B:
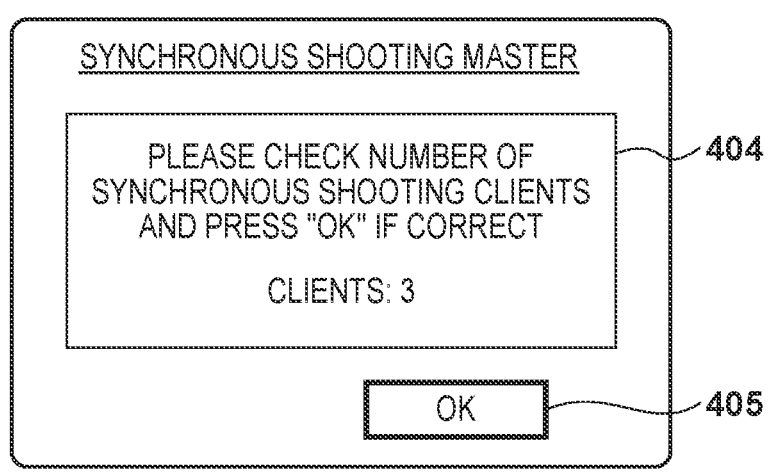

Next, a description is given of a synchronous shooting system in which a plurality of cameras 100 are connected with reference to FIGS. 3, 4A, and 4B.

A master 301 and clients 1 to 4 (303 to 306) are, for example, cameras 100, and construct a network, such as a wireless LAN and a wired LAN, via a relay device 302. The synchronous shooting system of the present embodiment composes a network in which connection is established via a wireless LAN and Ethernet®. Also, the roles of the master 301 and the clients 1 to 4 (303 to 306) are determined by a GUI operation, which will be described later, made by a user in a state where the network has been constructed.

FIGS. 4A and 4B exemplarily show GUI screens for designating the master and clients from among the cameras 100 that compose the synchronous shooting system of the present embodiment. Upon accepting an instruction for starting the synchronous shooting setting when the user has performed a GUI operation, which is not illustrated, with respect to a camera 100, the system control unit 201 displays a synchronous shooting setting screen shown in FIG. 4A on the display unit 101.

FIG. 4A exemplarily shows an initial state of the synchronous shooting setting screen. The synchronous shooting setting screen displays two options, namely "master" 401 and "client" 402, and a focus frame is located on "master" 401 in the initial state. On the synchronous shooting setting screen, the focus frame can be moved by operating the controller wheel 105. For example, performing an operation of rotating the controller wheel 105 rightward by a predetermined angle will move the focus frame to "client" 402, which is located one level down. Further performing an operation of rotating the controller wheel 105 rightward by the predetermined angle will move the focus frame to a cancel button 403, which is located further down.

When the SET button 106 is depressed in a state where the focus frame is located on one of the two options, namely "master" 401 and "client" 402, and the cancel button 403, the function at which the focus frame is located is executed as the decision made by the user. In a state where the focus frame is located on "master" 401, a transition is made to a synchronous shooting master screen shown in FIG. 4B, and synchronous shooting master setting processing, which will be described later, is started. In a state where the focus frame is located on "client" 402, synchronous shooting client setting processing, which will be described later, is started, and a transition is made to a screen for synchronous shooting clients, which is not illustrated. In a state where the focus frame is located on the cancel button 403, a transition is made to a screen previous to the synchronous shooting setting screen (FIG. 4A), which is not illustrated.

On the synchronous shooting master screen of FIG. 4B, a text portion 404 displays the number of cameras that have been set as clients from among the cameras 100 connected to the network, and the focus frame is located on an OK button 405 in an immobile manner. The master recognizes the cameras 100 that have been set as clients in accordance with a GUI operation that has been performed by the user with respect to the synchronous shooting master screen (FIG. 4B) as clients with a synchronous shooting function. When the SET button 106 is depressed with a confirmation that the text portion 404 displays the number that is the same as the number of the cameras 100 that have been set as clients in accordance with the user operation, a transition is made to a screen for the synchronous shooting master, which is not illustrated. Note that the screen for the synchronous shooting master and the screen for the synchronous shooting clients may be the same shooting screen.

<Synchronous Shooting Processing>

Next, synchronous shooting processing performed by a camera 100 of the present embodiment will be described with reference to FIGS. 5 to 7.

Figure 5:
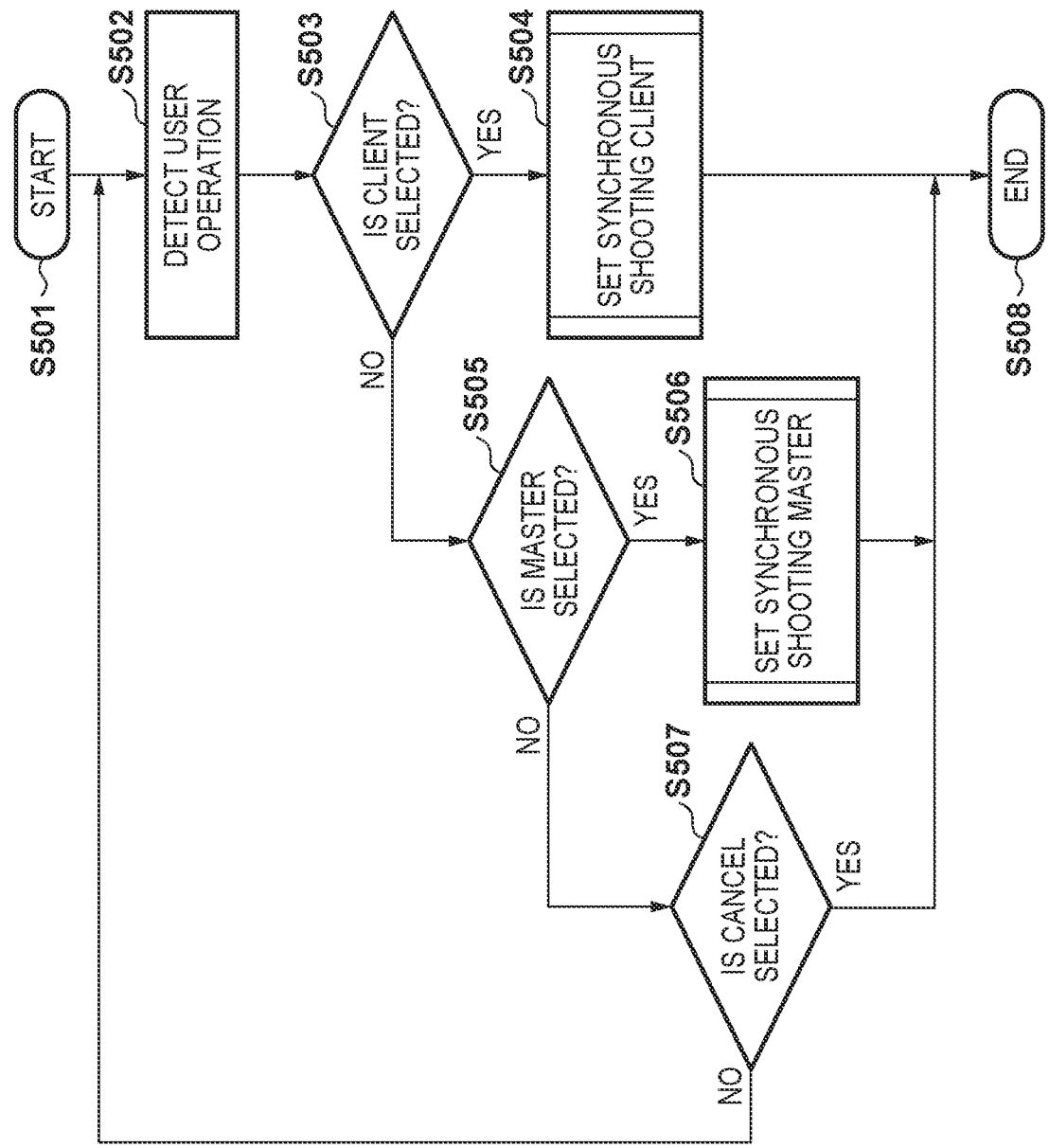
FIG. 5 is a flowchart showing synchronous shooting setting processing of the present embodiments.
Figure 6:
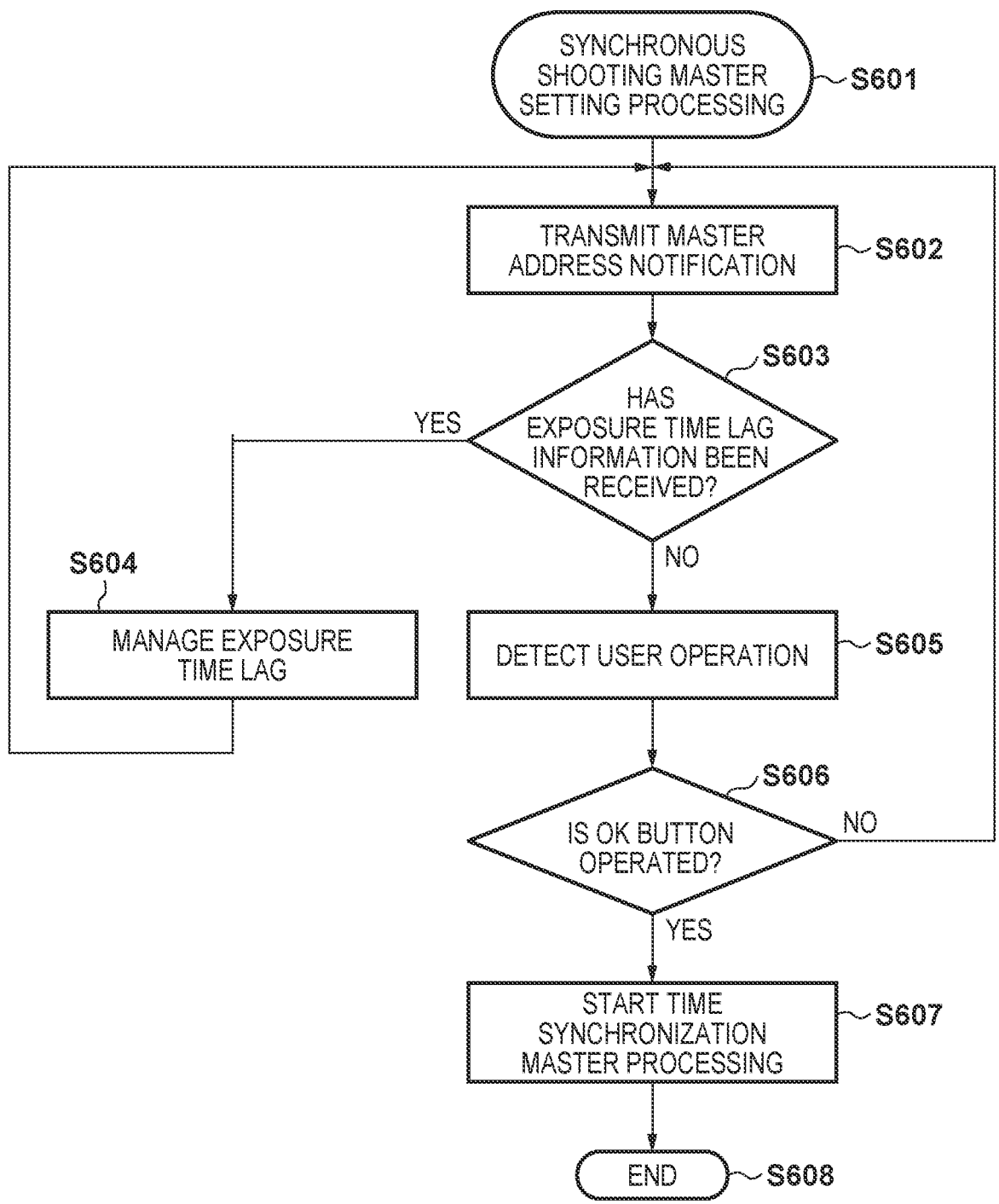
FIG. 6 is a flowchart showing synchronous shooting master setting processing on the master side of the present embodiments.
Figure 7:
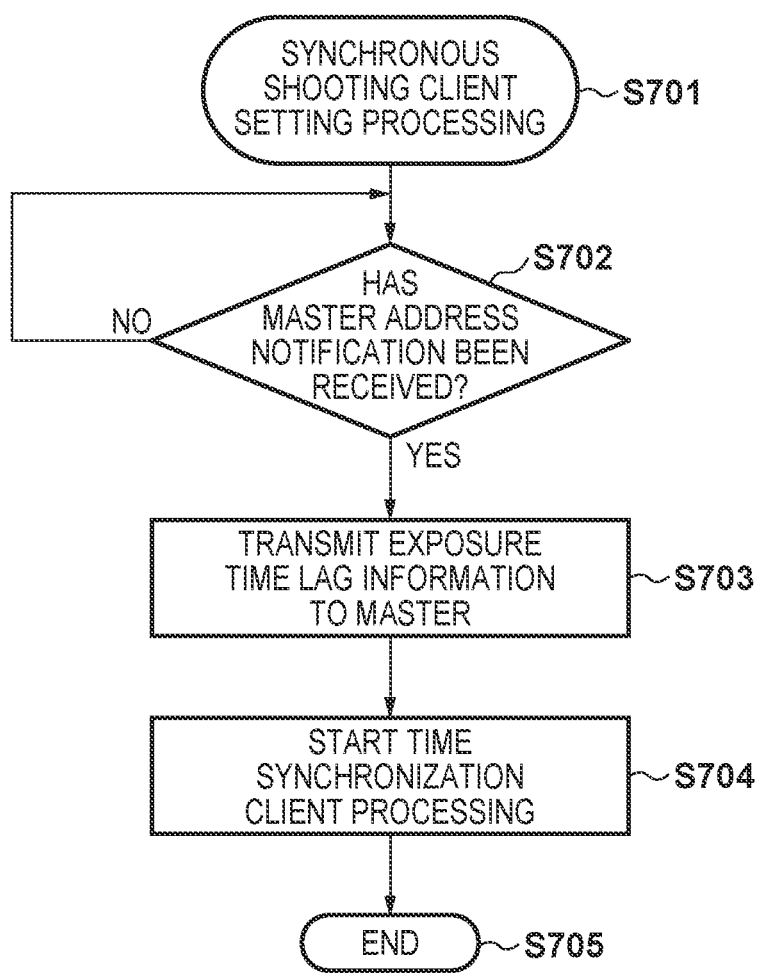
FIG. 7 is a flowchart showing synchronous shooting setting processing on the client side of the present embodiments.

Note that the processing of FIGS. 5 to 7 is realized by the system control unit 201 controlling the respective components of the camera 100 through the execution of programs stored in the nonvolatile memory 214. Furthermore, the present processing is started when the camera 100 accepts a synchronous shooting setting instruction via a user operation.

At the start of the synchronous shooting setting in step S501, the system control unit 201 displays the synchronous shooting setting screen of FIG. 4A on the display unit 101.

Step S502 is user operation detection processing. The system control unit 201 detects a user operation as an operational instruction from the operation units 104.

In step S503, the system control unit 201 determines whether the operational instruction detected in step S502 is a selection of "client" 402. If the operational instruction is the selection of "client" 402, processing proceeds to step S504. If the operational instruction is not the selection of "client" 402, processing proceeds to step S505.

Step S504 is the synchronous shooting client setting processing, which will be described later. The system control unit 201 executes the synchronous shooting client setting processing as background processing. Processing proceeds to step S508 without getting blocked.

In step S505, the system control unit 201 determines whether the operational instruction detected in step S502 is a selection of "master" 401. If the operational instruction is the selection of "master" 401, processing proceeds to step S506. If the operational instruction is not the selection of "master" 401, processing proceeds to step S507.

Step S506 is the synchronous shooting master setting processing, which will be described later. The synchronous shooting master setting processing is executed as a continuation of synchronous shooting setting processing, and once the synchronous shooting master setting processing has ended, step S508 follows.

In step S507, the system control unit 201 determines whether the operational instruction detected in step S502 is a cancellation (pressing of the cancel button 403). If the operational instruction is the cancellation, processing proceeds to step S508. If the operational instruction is not the cancellation, processing proceeds to step S502 so as to wait for the next operational instruction.

At the end of the synchronous shooting setting in step S508, if the operational instruction has been determined to be the selection of the cancellation in step S502, a transition is made to the screen previous to the synchronous shooting setting screen (FIG. 4A). If "master" 401 has been selected and the synchronous shooting master setting has ended, a transition is made to the screen for the synchronous shooting master, which is not illustrated. If "client" 402 has been selected, a transition is made to the screen for the synchronous shooting clients, which is not illustrated.

FIG. 6 is a flowchart showing the synchronous shooting master setting processing in step S506 of FIG. 5.

At the start of the synchronous shooting master setting processing in step S601, the system control unit 201 displays the synchronous shooting master screen of FIG. 4B on the display unit 101. Also, the system control unit 201 performs communication via the communication I/F 223 using TCP/IP protocols, UDP/IP protocols, or the like.

In step S602, the system control unit 201 transmits a master address notification to the clients via the communication I/F 223. The master address notification is transmitted, as a multicast packet, to a preset multicast address using UDP/IP. The clients receive the packet addressed to the preset multicast address, and manage its transmission source IP address as a master IP address.

In step S603, the system control unit 201 determines whether exposure time lag information has been received from the clients via the communication I/F 223. Processing proceeds to step S604 if the exposure time lag information has been received, and proceeds to step S605 if the exposure time lag information has not been received. Here, an exposure time lag is an exposure delay time from the reception of a shooting command until the actual start of exposure, and is measured and held by each client.

In step S604, the system control unit 201 manages the exposure time lags on a client-by-client basis. In this case, transmission source addresses of packets including the received exposure time lag information are used as information for determining each individual client. A client management table that manages the exposure time lag information will be described later using FIG. 8.

Step S605 is user operation detection. The system control unit 201 detects a user operation as an operational instruction from the operation units 104.

In step S606, the system control unit 201 determines whether the operational instruction detected in step S605 is pressing of the OK button 405. Processing proceeds to step S607 if the operational instruction is pressing of the OK button 405, and proceeds to step S602 if the operational instruction is not pressing of the OK button 405.

In step S607, the system control unit 201 starts time synchronization master processing in a time synchronization sequence of FIG. 9, which will be described later. This processing is executed as background processing, and continues until the power is turned OFF by the power switch 107, or until an instruction for ending the synchronous shooting is issued on a synchronous shooting end screen, which is not illustrated.

After the end of the synchronous shooting master setting processing in step S608, processing proceeds to the end of the synchronous shooting setting in step S508.

FIG. 7 is a flowchart showing the synchronous shooting client setting processing in step S504 of FIG. 5.

At the start of the synchronous shooting client setting processing in step S701, the screen for the synchronous shooting clients, which is not illustrated, is displayed on the display unit 101. Also, the system control unit 201 performs communication via the communication I/F 223 using TCP/IP protocols, UDP/IP protocols, or the like.

In step S702, the system control unit 201 determines whether a master address notification has been received via the communication I/F 223; processing proceeds to step S703 if the master address notification has been received, and returns to step S702 if the master address notification has not been received. The master address notification is received as a multicast packet to a preset multicast address using UDP/IP. The master address notification is transmitted in step S602 of FIG. 6. At this time, a transmission source IP address of the received multicast packet is managed as a master IP address.

In step S703, the system control unit 201 transmits exposure time lag information to a master via the communication I/F 223. The exposure time lag information is information held by each camera 100. Its transmission destination is the master IP address managed in step S702.

In step S704, the system control unit 201 starts time synchronization client processing in the time synchronization sequence of FIG. 9, which will be described later. This processing is executed as background processing, and continues until the power is turned OFF by the power switch 107, or until an instruction for ending the synchronous shooting is issued on the synchronous shooting end screen, which is not illustrated.

At the end of the synchronous shooting client setting processing in step S705, the system control unit 201 ends the synchronous client setting processing.

FIG. 8 exemplarily shows the client management table that is managed inside a master. The client management table manages various types of information of clients acting as synchronous shooting cameras.

Client IDs 801 to 804 are pieces of unique information that respectively correspond to the clients, and are assigned in the order of reception of the exposure time lag information.

IP addresses 811 to 814 are address information that is managed on a client-by-client basis, and are transmission source IP addresses of packets that include the exposure time lag information received in step S603.

Pieces of exposure time lag information 821 to 824 are information that is managed on a client-by-client basis. The exposure time lag information received in step S603 is managed in association with the transmission source IP addresses of the packets.

One-way communication times 831 to 834 are one-way communication delay times between the master and the clients, and are managed on a client-by-client basis. In the time synchronization sequence of FIG. 9, which will be described later, the clients 1 to 4 (303 to 306) notify the master 301 of one-way communication times, which are managed in the table as one-way communication times with the clients corresponding to the transmission source IP addresses of the packets. Note that regarding the one-way communication times, it is permissible to keep holding only the first notifications from the clients 1 to 4 (303 to 306), or it is permissible to constantly update the table to the newest values when values are updated by the next notifications. Also, the table may be updated only when the notifications include values larger than the values held in the table. Furthermore, received notifications may be held in correspondence with a certain number of clients, and the table may be updated using an average value of the received notifications. In obtaining the average, outliers may be filtered out by ignoring the largest value and the smallest value.

Figure 9:
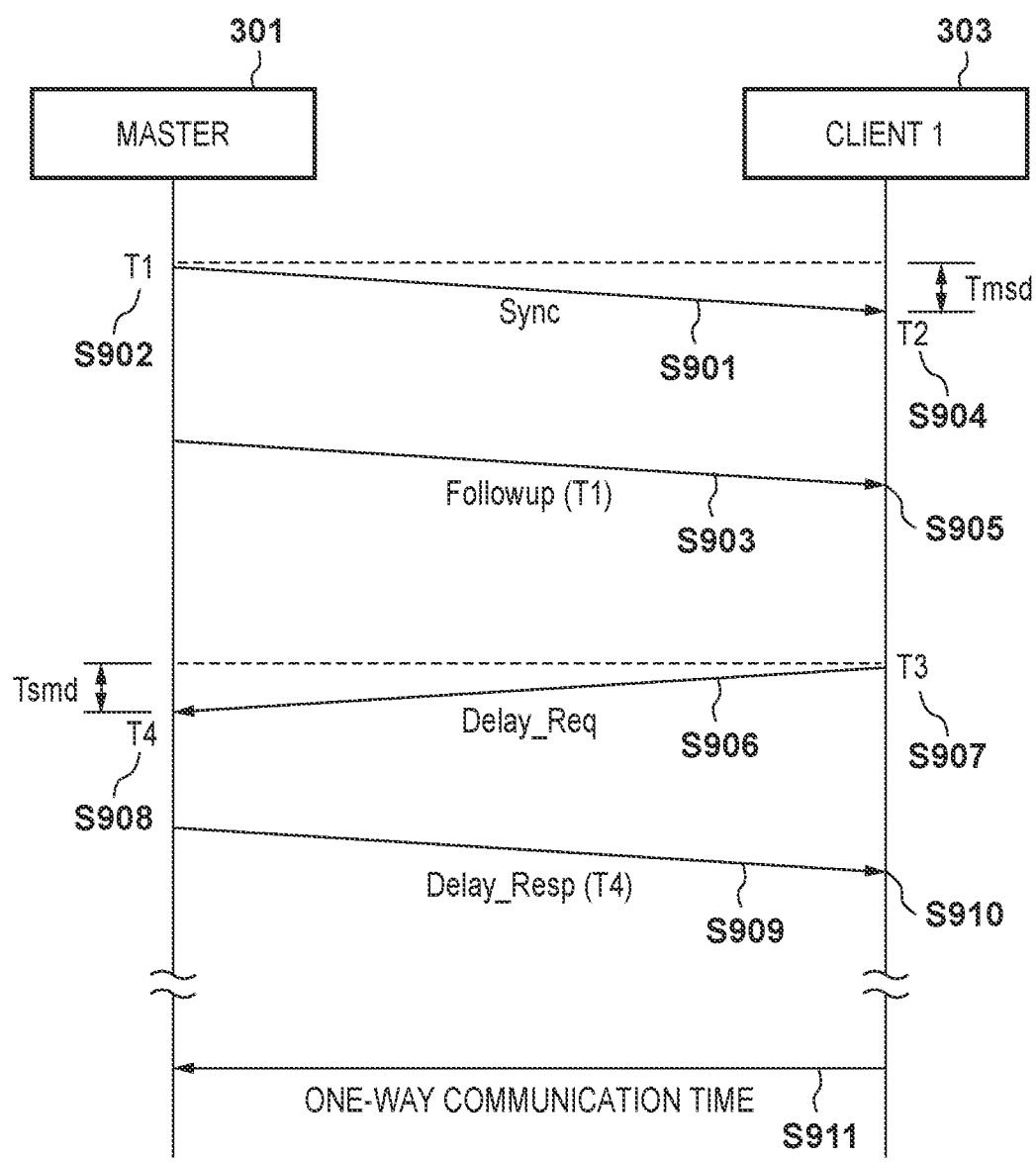
FIG. 9 is a sequence diagram showing time synchronization processing of the present embodiments.

FIG. 9 shows the time synchronization sequence executed between the master and the clients. The sequence of FIG. 9 is executed by the system control unit 201 of each camera 100. Time synchronization is performed using a mechanism compliant with the IEEE 1588 Precision Time Protocol (hereinafter, PTP). PTP defines at least four types of packets: Sync, Followup, Delay_Req, and Delay_Resp. Using these packets, each of the clients 1 to 4 (303 to 306 of FIG. 3) performs time synchronization by calculating a time difference (time offset) between a time measured by itself and a time measured by the master 301, and a communication delay time. Although the following description will be given using a diagram of a sequence between the master 301 and the client 1 (303), a similar sequence is executed also between the master 301 and the clients 2 to 4 (304 to 306) to perform time synchronization.

In step S901, the master 301 transmits a Sync packet to the client 1 (303) at time T1. At this time, the master 301 stores time T1 at which the Sync packet was transmitted (step S902). Also, the client 1 (303) stores time T2 at which the Sync packet was received from the master 301 (step S904).

In step S903, the master 301 transmits a Followup packet that includes time T1 to the client 1 (303). Here, each of the Sync packet and the Followup packet may be transmitted via unicast, or may be transmitted via multicast. The client 1 (303) receives the Followup packet, and acquires the transmission time T1 of the Sync packet from this Followup packet (step S905).

Using the Sync packet and the Followup packet, the client 1 (303) can calculate a communication delay time Tmsd from the master 301 to the client 1 (303). Specifically, provided that a time offset of the client 1 (303) relative to the master 301 is Tms, the communication delay time Tmsd from the master 301 to the client 1 (303) can be represented by the following expression 1.

$$Tmsd = (T2 + Tms) - T1 = (T2 - T1) + Tms \qquad \text{(Expression 1)}$$

In step S906, the client 1 (303) transmits a Delay_Req packet to the master 301 at time T3. In this case, the client 1 (303) stores time T3 at which the Delay_Req packet was transmitted (step S907). Also, the master 301 stores time T4 at which the Delay_Req packet was received from the client 1 (303) (step S908).

In step S909, the master 301 transmits a Delay_Resp packet that includes time T4 to the client 1 (303). The client 1 (303) receives the Delay_Resp packet, and acquires the reception time T4 of the Delay_Req packet from this Delay_Resp packet (step S910).

Using these Delay_Req packet and Delay_Resp packet, the client 1 (303) can calculate a communication delay time Tsmd from the client 1 (303) to the master 301. Specifically, provided that a time offset of the master 301 relative to the client 1 (303) is Tms, the communication delay time Tsmd from the client 1 (303) to the master 301 can be represented by the following expression 2.

$$Tsmd = T4 - (T3 + Tms) = (T4 - T3) - Tms \qquad \text{(Expression 2)}$$

Here, assuming that the communication delay time Tmsd from the master 301 to the client 1 (303) and the communication delay time Tsmd from the client 1 (303) to the master 301 are the same Td, expressions 1 and 2 are converted into the following expressions 1' and 2'.

$$Td = (T2 + Tms) - T1 = (T2 - T1) + Tms \qquad \text{(Expression 1')}$$

$$Td = T4 - (T3 + Tms) = (T4 - T3) - Tms \qquad \text{(Expression 2')}$$

T1 to T4 are actual times (numeric values), and a communication delay time Td and a time offset Tms can be obtained by solving these expressions.

$$Td = ((T2 - T1) + (T4 - T3))/2 \qquad \text{(Expression 3)}$$

$$Tms = ((T4 - T3) - (T2 - T1))/2 \qquad \text{(Expression 4)}$$

The client 1 (303) synchronizes to a clock of the master 301 by calculating the time offset Td and the delay time Tms from expressions 3 and 4 and correcting its own clock.

In step S911, the client 1 (303) notifies the master 301 of the communication delay time Td that has been calculated in the time synchronization sequence as a one-way communication time. The notification may include only the result of calculating the first communication delay time, may be given periodically, or may be given only when the communication delay time Td has changed by a predetermined amount or more. Note that the notification of the one-way communication time in step S911 is an example, and is not defined by PTP.

Figure 10:
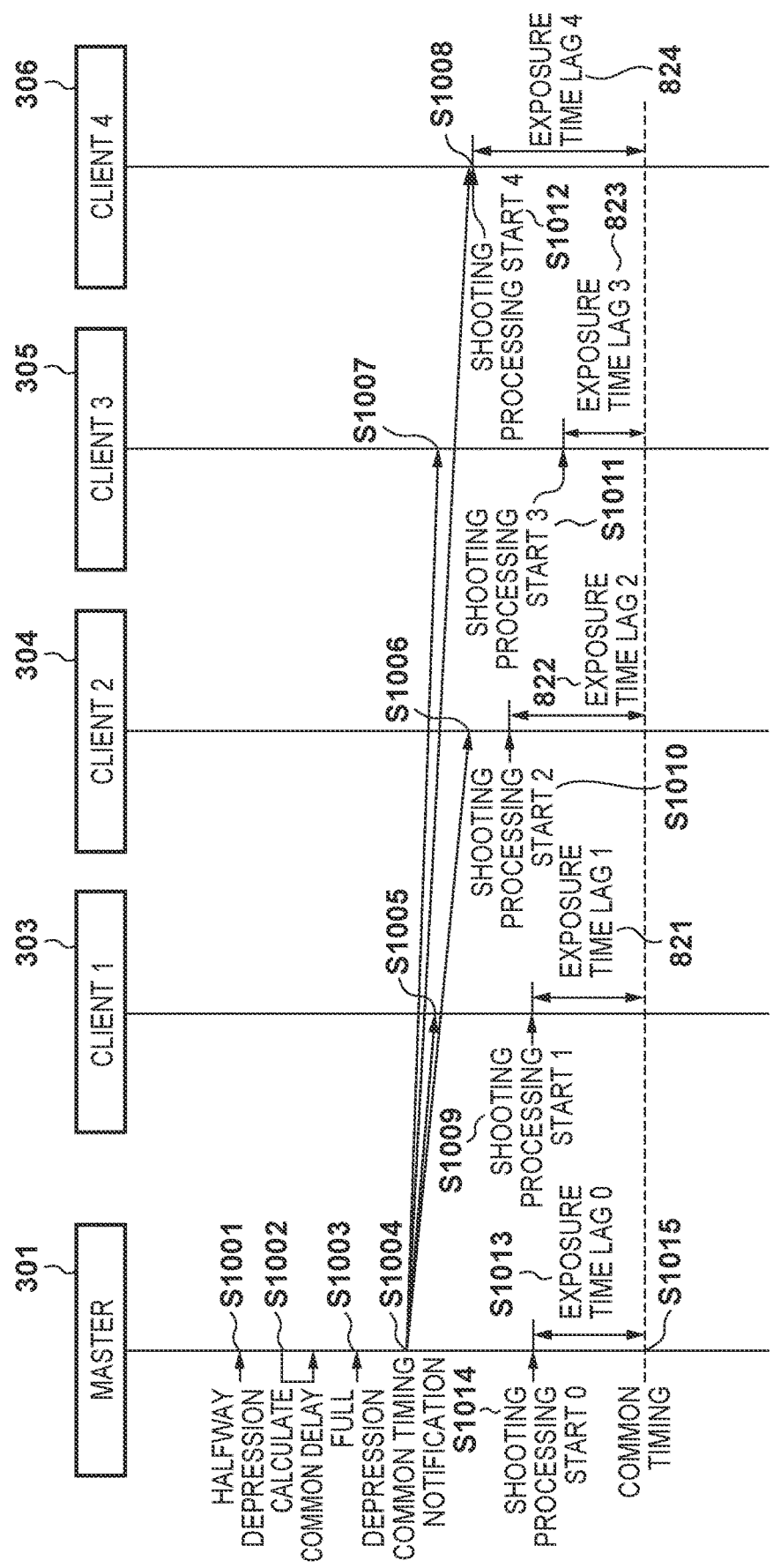
FIG. 10 is a sequence diagram showing synchronous shooting processing of a first embodiment.

FIG. 10 shows a synchronous shooting sequence of the present embodiment. The synchronous shooting sequence is started after the synchronous shooting setting has been completed. Specifically, in the case of a master, the synchronous shooting sequence is started after the end of the synchronous shooting setting in step S508 of FIG. 5, whereas in the case of a client, the synchronous shooting sequence is started after the end of the synchronous shooting client setting in step S705 of FIG. 7. The synchronous shooting sequence is executed by the system control unit 201 of each camera 100. Also, the time synchronization sequence is executed concurrently with the synchronous shooting sequence.

In step S1001, a user of the master 301 depresses the shutter button 102 halfway, and the system control unit 201 accordingly detects the ON state of the first shutter switch 102a.

In step S1002, after detecting the halfway depression of the shutter button 102, the system control unit 201 calculates a common delay (common delay time), which is delay time information common to all clients. In the present embodiment, out of a sum of the largest value of the exposure time lags 821 to 824 and the largest value of the one-way communication times 831 to 834 and the exposure time lag of the master 301, a larger value is used as the common delay. For example, assume a case where the exposure time lag of the master 301 is 50 ms, and the exposure time lags and the one-way communication times of the clients 1 to 4 (303 to 306) are as shown in the example of FIG. 8. In this case, the largest value of the exposure time lags is 75 ms, and the largest value of the one-way communication times is 7 ms; thus the calculated common delay is 75+7=82 ms (larger than 50 ms). Here, when the calculated common delay is larger than a predetermined largest value, the largest value of the common delay may be used as the common delay.

In step S1003, the user of the master 301 depresses the shutter button 102 fully, and the system control unit 201 accordingly detects the ON state of the second shutter switch 102b.

In step S1004, after detecting the full depression of the shutter button 102, the system control unit 201 issues a common timing notification. The common timing notification notifies the clients 1 to 4 (303 to 306) managed in the client management table of a shooting command including a common timing, which is a time obtained by adding the common delay to the current time. Here, the shooting command acting as the common timing notification may be transmitted via multicast, or may be transmitted via unicast. In the case of multicast transmission, the shooting command is transmitted to a preset multicast address. In the case of unicast transmission, a sum of the exposure time lag and the one-way communication time is calculated on a client-by-client basis with reference to the client management table, and the shooting command is transmitted continuously in descending order of the sum.

Step S1005 is a timing at which the client 1 (303) receives the shooting command as the common timing notification, and is a time that is behind the common timing notification of step S1004 by the one-way communication time 831 between the master 301 and the client 1 (303). The client 1 (303) starts exposure processing at a shooting processing start 1 (step S1009) obtained by subtracting its own exposure time lag 1 (821) from the common timing of step S1005 included in the shooting command acting as the common timing notification.

In step S1006, the client 2 (304) receives the shooting command as the common timing notification. The reception timing is a time that is behind the common timing notification of step S1004 by the one-way communication time 832 between the master 301 and the client 2 (304). The client 2 (304) starts exposure processing at a shooting processing start 2 (step S1010) obtained by subtracting its own exposure time lag 2 (822) from the common timing (step S1005) included in the shooting command acting as the common timing notification.

In step S1007, the client 3 (305) receives the shooting command as the common timing notification. The reception timing is a time that is behind the common timing notification of step S1004 by the one-way communication time 833 between the master 301 and the client 3 (305). The client 3 (305) starts exposure processing at a shooting processing start 3 (step S1011) obtained by subtracting its own exposure time lag 3 (823) from the common timing of step S1005 included in the shooting command acting as the common timing notification.

In step S1008, the client 4 (306) receives the shooting command as the common timing notification. The reception timing is a time that is behind the common timing notification of step S1004 by the one-way communication time 834 between the master 301 and the client 4 (306). The client 4 (306) starts exposure processing at a shooting processing start 4 (step S1012) obtained by subtracting its own exposure time lag 4 (824) from the common timing of step S1005 included in the shooting command acting as the common timing notification.

The master 301 starts exposure processing at a shooting processing start 0 (step S1014) obtained by subtracting its own exposure time lag 0 (step S1013) from the common timing of step S1005.

Step S1015 is the common timing, and each of other devices starts shooting processing at a timing obtained by subtracting the exposure time lag from the common timing; as a result, all of the clients 1 to 4 (303 to 306) can perform exposure at the same timing.

However, when the shooting processing starts 1 to 4 (steps S1009 to S1012) are behind the current time, the clients 1 to 4 (303 to 306) immediately start exposure processing. This could occur when the largest value of the common delay is used as the common delay.

According to the first embodiment, as the master issues a shooting command that designates an exposure timing as an absolute time to each client, strict timing adjustment becomes unnecessary, and hence the processing load of the master at the time of shooting can be reduced.

Second Embodiment

Next, a second embodiment will be described.

In the second embodiment, a description is given of a method in which a master controls all clients via a user operation, and synchronous shooting is performed by designating an exposure timing as a relative time, namely, time elapsed since the current time.

An external view of a digital camera in the second embodiment is the same as FIG. 1. A block diagram showing an exemplary configuration of a camera 100 in the second embodiment is the same as FIG. 2. A configuration diagram of a synchronous shooting system in the second embodiment is the same as FIG. 3. GUI screens for designating a master and clients in synchronous shooting in the second embodiment are the same as those of FIGS. 4A and 4B. Synchronous shooting setting processing in the second embodiment is the same as that of FIG. 5. Synchronous shooting master setting processing in the second embodiment is the same as that of FIG. 6. Synchronous shooting client setting processing in the second embodiment is the same as that of FIG. 7. A client management table in the second embodiment is the same as that of FIG. 8.

A time synchronization sequence in the second embodiment is the same as that of FIG. 9. However, it is assumed that the clients calculate and hold one-way communication times using a method that is the same as the method of determining one-way communication times held in the client management table managed by the master.

Figure 11:
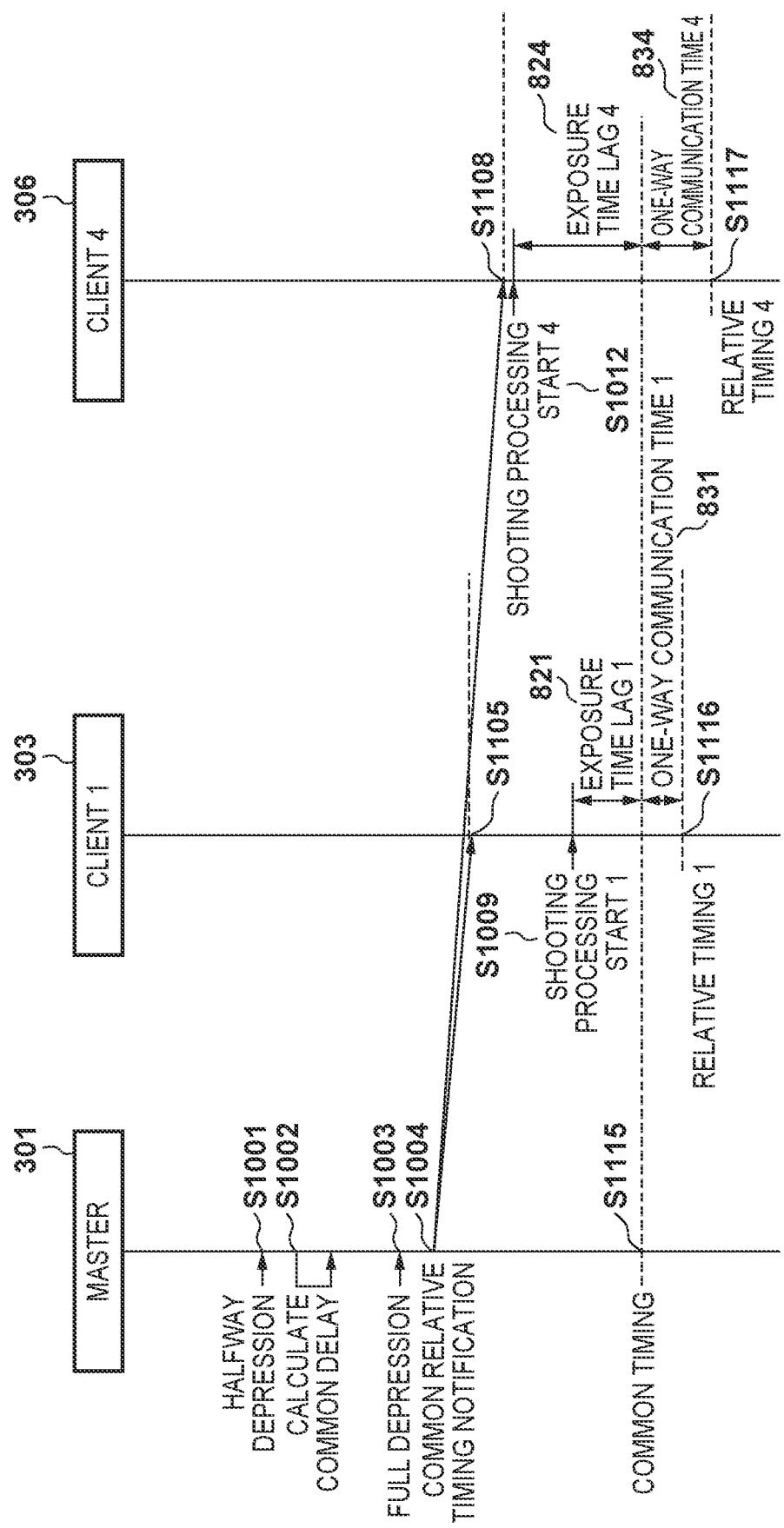
FIG. 11 is a sequence diagram showing synchronous shooting processing of a second embodiment.

FIG. 11 shows the synchronous shooting sequence of the second embodiment. In FIG. 11, processing that is the same as the synchronous shooting sequence of FIG. 10 according to the first embodiment will be given the same reference sign thereas, and its description will be omitted. Furthermore, although only the clients 1 and 4 are shown, the client 2 (304) and the client 3 (305) can operate in a similar manner.

In step S1104, after detecting the full depression of the shutter button 102, the system control unit 201 issues a common relative timing notification. The common relative timing notification notifies the clients 1 to 4 (303 to 306) managed in the client management table of a shooting command including a relative common timing from the reception of the notification as a common delay. Here, the shooting command acting as the common relative timing notification may be transmitted via multicast, or may be transmitted via unicast. In the case of multicast transmission, the shooting command is transmitted to a preset multicast address. In the case of unicast transmission, a sum of the exposure time lag and the one-way communication time is calculated on a client-by-client basis with reference to the client management table, and the shooting command is transmitted continuously in descending order of the sum.

In step S1105, the client 1 (303) receives the shooting command as the common relative timing notification. The reception timing is a time that is behind the common relative timing notification of step S1104 by the one-way communication time 831 between the master 301 and the client 1 (303).

Step S1116 is a relative timing 1 (step S1116) obtained by adding the received common relative timing to a timing at which the shooting command was received as the common relative timing notification in step S1105.

The client 1 (303) starts exposure processing at a shooting processing start 1 (step S1009) obtained by subtracting its own one-way communication time 1 (831) held in the time synchronization sequence of the present embodiment and the exposure time lag 1 (821) held in itself from the relative timing (step S1116).

In step S1108, the client 4 (306) receives the shooting command as the common relative timing notification. The reception timing is a time that is behind the common relative timing notification of step S1104 by the one-way communication time 834 between the master 301 and the client 4 (306).

Step S1117 is a relative timing 4 (step S1116) obtained by adding the received common relative timing to a timing at which the shooting command was received as the common relative timing notification in step S1108. The client 4 (306) starts exposure processing at a shooting processing start 4 (step S1012) obtained by subtracting its own one-way communication time 4 (834) held in the time synchronization sequence of the present embodiment and the exposure time lag 4 (824) held in itself from the relative timing (step S1117).

Step S1115 is the common timing, and each terminal starts shooting processing at a timing obtained by subtracting the one-way communication time and the exposure time lag from the common relative timing; as a result, all of the clients 1 (303) and 4 (306) can start exposure processing at the same timing.

According to the present embodiment, as the master issues a shooting command that designates a relative time, namely, time elapsed since the current time, to each client, strict timing adjustment becomes unnecessary, and hence the processing load of the master at the time of shooting can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-245375, filed Dec. 27, 2018 which is hereby incorporated by reference herein in its entirety.

What is claimed is:

1. An image capture apparatus comprising:
a communication interface that communicates with at least one or more other image capture apparatuses; and
a controller,
wherein the controller
acquires exposure delay times and communication delay times of the respective other image capture apparatuses, the exposure delay times being information of times from when the other image capture apparatuses receive a shooting command until when the other image capture apparatuses start exposure, the communication delay times being information of times required in communication with the other image capture apparatuses, determines a common delay time based on the acquired communication delay times and exposure delay times of the respective other image capture apparatuses, the common delay time being delay time information that is common to all of the other image capture apparatuses, and upon accepting a shooting instruction, transmits the shooting command including a common timing obtained from the common delay time to the other image capture apparatuses via the communication interface.

2. The apparatus according to claim 1, wherein the controller acquires the communication delay times via notifications from the other image capture apparatuses, and the communication delay times are calculated by the other image capture apparatuses through communication via the communication interface.

3. The apparatus according to claim 2, wherein the notifications of the communication delay times are given periodically, and upon accepting the shooting instruction, the controller determines the common delay time from the acquired exposure delay times and newest communication delay times.

4. The apparatus according to claim 1, wherein the controller transmits the shooting command via multicast using the communication interface.

5. The apparatus according to claim 2, wherein the controller acquires the newest communication delay times by continuing the acquisition of the communication delay times from the other image capture apparatuses.

6. The apparatus according to claim 5, wherein the controller applies the newest communication delay times acquired from the other image capture apparatuses.

7. The apparatus according to claim 5, wherein the controller applies the largest value of the communication delay times acquired from the other image capture apparatuses.

8. The apparatus according to claim 5, wherein the controller applies an average value of the communication delay times acquired from the other image capture apparatuses.

9. The apparatus according to claim 8, wherein the controller ignores a value that differs by more than a predetermined amount from the average value of the communication delay times acquired from the other image capture apparatuses.

10. The apparatus according to claim 1, wherein the common timing is an absolute time obtained by adding the common delay time to a current time.

11. The apparatus according to claim 1, wherein the common timing is a time elapsed since a current time, and is obtained by adding a predetermined period to the common delay time.

12. The apparatus according to claim 1, wherein when the common delay time is larger than a predetermined largest value, the controller uses the largest value as the common timing.

13. An image capture control apparatus comprising:

a communication interface that communicates with at least one or more image capture apparatuses; and a controller, wherein the controller acquires exposure delay times and communication delay times of the respective image capture apparatuses, the exposure delay times being information of times from when the image capture apparatuses receive a shooting command until when the image capture apparatuses start exposure, the communication delay times being information of times required in communication with the image capture apparatuses, determines a common delay time based on the acquired communication delay times and exposure delay times of the respective image capture apparatuses, the common delay time being delay time information that is common to all of the image capture apparatuses, and upon accepting a shooting instruction, transmits the shooting command including a common timing obtained from the common delay time to the image capture apparatuses via the communication interface.

14. A system in which a plurality of image capture apparatuses are communicably connected, the system comprising:

a first image capture apparatus including a communication interface and a controller, the communication interface being for communicating with at least one or more second image capture apparatuses, wherein the controller acquires exposure delay times and communication delay times of the respective second image capture apparatuses, the exposure delay times being information of times from when the second image capture apparatuses receive a shooting command until when the second image capture apparatuses start exposure, the communication delay times being information of times required in communication with the second image capture apparatuses, determines a common delay time based on the acquired communication delay times and exposure delay times of the respective second image capture apparatuses, the common delay time being delay time information that is common to all of the second image capture apparatuses, and upon accepting a shooting instruction, transmits the shooting command including a common timing obtained from the common delay time to the second image capture apparatuses via the communication interface; and the second image capture apparatuses each including a communication interface and a controller, the communication interface being for communicating with the first image capture apparatus, wherein the controller starts shooting processing in accordance with the common timing included in the shooting command received from the first image capture apparatus.

15. A method of controlling an image capture apparatus having a communication interface and a controller, the communication interface being for communicating with at least one or more other image capture apparatuses, the method comprising:

acquiring exposure delay times and communication delay times of the respective other image capture apparatuses, the exposure delay times being information of times from when the other image capture apparatuses receive a shooting command until when the other image capture apparatuses start exposure, the communication delay times being information of times required in communication with the other image capture apparatuses;

determining a common delay time based on the acquired communication delay times and exposure delay times of the respective other image capture apparatuses, the common delay time being delay time information that is common to all of the other image capture apparatuses; and upon accepting a shooting instruction, transmitting the shooting command including a common timing obtained from the common delay time to the other image capture apparatuses via the communication interface.

16. A non-transitory computer-readable storage medium storing a program for causing a computer to execute a method of controlling an image capture apparatus having a communication interface and a controller, the communication interface being for communicating with at least one or more other image capture apparatuses, the method comprising:

acquiring exposure delay times and communication delay times of the respective other image capture apparatuses, the exposure delay times being information of times from when the other image capture apparatuses receive a shooting command until when the other image capture apparatuses start exposure, the communication delay times being information of times required in communication with the other image capture apparatuses;

determining a common delay time based on the acquired communication delay times and exposure delay times of the respective other image capture apparatuses, the common delay time being delay time information that is common to all of the other image capture apparatuses; and upon accepting a shooting instruction, transmitting the shooting command including a common timing obtained from the common delay time to the other image capture apparatuses via the communication interface.

* * * * *